United States Patent
Li et al.

(10) Patent No.: US 12,449,703 B2
(45) Date of Patent: Oct. 21, 2025

(54) DISPLAY PANEL AND DISPLAY DEVICE

(71) Applicants: Beijing BOE Optoelectronics Technology Co., Ltd., Beijing (CN); BOE Technology Group Co., Ltd., Beijing (CN)

(72) Inventors: Ning Li, Beijing (CN); Ce Wang, Beijing (CN); Hongsheng Bi, Beijing (CN); Xuan Zhong, Beijing (CN); Bangjun Song, Beijing (CN); Kangdi Zhou, Beijing (CN); Jin Gao, Beijing (CN); Xueyong Zhai, Beijing (CN); Donghua Zhang, Beijing (CN); Ziqi Sun, Beijing (CN); Zhikai Wu, Beijing (CN); Jiulei Zhou, Beijing (CN); Yao Bi, Beijing (CN)

(73) Assignees: Beijing BOE Optoelectronics Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/561,605

(22) PCT Filed: Feb. 9, 2023

(86) PCT No.: PCT/CN2023/075234
§ 371 (c)(1),
(2) Date: Nov. 16, 2023

(87) PCT Pub. No.: WO2024/164239
PCT Pub. Date: Aug. 15, 2024

(65) Prior Publication Data
US 2025/0138375 A1    May 1, 2025

(51) Int. Cl.
G02F 1/1362    (2006.01)
G02F 1/1343    (2006.01)
H10D 86/40    (2025.01)

(52) U.S. Cl.
CPC .. *G02F 1/136218* (2021.01); *G02F 1/134309* (2013.01); *G02F 1/136286* (2013.01); *H10D 86/441* (2025.01)

(58) Field of Classification Search
CPC ......... G02F 1/136286; G02F 1/133512; G02F 1/134309; G02F 1/136218
(Continued)

(56) References Cited

U.S. PATENT DOCUMENTS

2019/0353940 A1    11/2019 Zhao et al.
2022/0229338 A1    7/2022 Zhu et al.
2022/0342266 A1    10/2022 Hu et al.

FOREIGN PATENT DOCUMENTS

CN    210691002 U    6/2020
CN    111610677 A    9/2020
(Continued)

OTHER PUBLICATIONS

Espacenet English machine translation of CN111736387A (Year: 2020).*

*Primary Examiner* — Michael H Caley
*Assistant Examiner* — David Y Chung
(74) *Attorney, Agent, or Firm* — IPro, PLLC

(57) ABSTRACT

Provided is a display panel. The display panel includes: a first substrate and a second substrate disposed opposite to each other, and a liquid crystal layer disposed between the first substrate and the second substrate; wherein the first substrate comprises a first base substrate, a plurality of first signal lines and a plurality of second signal lines disposed on a side, close to the second substrate, of the first substrate;

(Continued)

and the second substrate comprises a second base substrate, and a shielding layer disposed on a side, close to the first substrate, of the second base substrate.

18 Claims, 12 Drawing Sheets

(58) Field of Classification Search
USPC .................................................. 349/145, 146
See application file for complete search history.

(56) References Cited

FOREIGN PATENT DOCUMENTS

| CN | 111736387 A | * | 10/2020 | ....... G02F 1/133512 |
|----|-------------|---|---------|----------------------|
| CN | 107741675 B |   | 11/2020 |                      |
| CN | 112859463 A |   | 5/2021  |                      |
| CN | 108761930 B |   | 11/2021 |                      |
| CN | 108388039 B |   | 2/2022  |                      |

* cited by examiner

DISPLAY PANEL AND DISPLAY DEVICE

CROSS-REFERENCE TO RELATED APPLICATION

This application is a U.S. national phase application based on PCT/CN2023/075234, filed on Feb. 9, 2023, the disclosure of which is incorporated herein by reference in its entirety.

TECHNICAL FIELD

The present disclosure related the field of display, and in particular to a display panel and a display device.

BACKGROUND

Liquid crystal display (LCD) panels are widely used in various types of display devices because of their high resolution, low cost, and low power consumption.

SUMMARY

Embodiments of the present disclosure provide a display panel and display device. The technical solutions are described as follows.

According to some embodiments of the present disclosure, a display panel is provided. The display panel includes a first substrate and a second substrate disposed opposite to each other, and a liquid crystal layer disposed between the first substrate and the second substrate; wherein the first substrate includes a first base substrate, a plurality of first signal lines and a plurality of second signal lines disposed on a side, close to the second substrate, of the first substrate, wherein the plurality of first signal lines are spaced apart in a first direction, the plurality of second signal lines are spaced apart in a second direction, and adjacent two of the first signal lines are insulatively intersected with adjacent two of the second signal lines to define a sub-pixel, the sub-pixel includes a pixel electrode; and the second substrate includes a second base substrate, and a shielding layer disposed on a side, close to the first substrate, of the second base substrate, wherein an orthographic projection of the shielding layer on the first base substrate covers an orthographic projection of the first signal lines on the first base substrate and covers an orthographic projection of the second signal lines on the first base substrate;

wherein the first direction is intersected with the second direction, in the first direction, the pixel electrode includes at least two domains and a first corner portion connecting two adjacent domains, the second signal line includes at least two line body portions one-to-one corresponding to the at least two domains and a second corner portion corresponding to the first corner portion and connecting two adjacent line body portions, and a portion of the shielding layer covering the second signal line includes at least two shielding body portions one-to-one corresponding to the at least two domains, and a third corner portion corresponding to the first corner portion and connecting adjacent two of the shielding body portions; and an area of an orthographic projection of the second corner portion on the first base substrate is less than an area of an orthographic projection of the third corner portion on the first base substrate, and the orthographic projection of the second corner portion on the first base substrate is within the orthographic projection of the third corner portion on the first base substrate.

In some embodiments, a height of a side, away from the pixel electrode, of the third corner portion is greater than a height of a side, away from the pixel electrode, of the second corner portion; and a height of a side, close to the pixel electrode, of the third corner portion is less than a height of a side, close to the pixel electrode, of the second corner portion.

In some embodiments, in the first direction, the height of the side, close to the pixel electrode, of the second corner portion is equal to the height of the side, away from the pixel electrode, the second corner portion; a difference between the height of the side, away from the pixel electrode, of the third corner portion and the height of side, away from the pixel electrode, of the second corner portion ranges from 0 to 1 µm; and a difference between the height of the side, close to the pixel electrode, of the third corner portion and the height of the side, close to the pixel electrode, of the second corner portion ranges from 0 to 1 µm.

In some embodiments, in the second direction, a width of the shielding layer is greater than a width of the second signal line; and a width of the third corner portion in the shielding layer is greater than a width of the shielding body portion, and a width of the second corner portion in the second signal line is equal to a width of the line body portion.

In some embodiments, in the second direction, a difference between the width of the shielding body portion and the width of the line body portion ranges from 2 µm to 3 µm; and a difference between the width of the third corner portion and the width of the second corner portion ranges from 3 µm to 4 µm.

In some embodiments, in the second direction, a width of a sharp corner of the third corner portion is equal to a width at any other place of the third corner portion other than the sharp corner.

In some embodiments, in the second direction, the shielding layer further includes an auxiliary shielding portion disposed on at least one of two sides of the third corner portion, and the auxiliary shielding portion abuts at least one side of the third corner portion.

In some embodiments, in the first direction, two ends of the auxiliary shielding portion are coincident with two ends of the third corner portion respectively; and a side, close to the third corner portion, of the auxiliary shielding portion is coincident with a side, close to the auxiliary shielding portion, of the third corner portion, and an orthographic projection of a side, distal from the third corner portion, of the auxiliary shielding portion on the second base substrate is curvilinear to or rectilinear.

In some embodiments, the orthographic projection of the side, distal from the third corner portion, of the auxiliary shielding portion on the second base substrate is rectilinear; and the side, away from the third corner portion, of the auxiliary shielding portion includes a first straight line and a second straight line intersected with the first straight line in an extending direction; and in the second direction, sharp corners formed by the first straight line and the second straight line, sharp corners of the third corner portion, and sharp corners of the second corner portion are on a same horizontal line and oriented in same direction.

In some embodiments, an orthographic projection of the side, distal from the third corner portion, of the auxiliary shielding portion on the second base substrate is curvilinear; the side, distal from the third corner portion, of the auxiliary shielding portion includes a curve; and in the second direction, a concave point of the curve is on a same horizontal line as sharp corners of the third corner portion and sharp corners of the second corner portion, and a concave direction of the curve is in a same direction as orientation directions of the sharp corners of the third corner portion and orientation directions of the sharp corners of the second corner portion.

In some embodiments, for the auxiliary shielding portion disposed on a side, away from the pixel electrode, of the third corner portion, the concave point of the curve in the auxiliary shielding portion is connected to the sharp corner of the third corner portion.

In some embodiments, in the second direction, a maximum depth of the auxiliary shielding portion ranges from 0.5 to 1 times a target depth;

wherein the target depth is a depth of the sharp corner of a side, close to the pixel electrode, of the third corner portion.

In some embodiments, the sharp corner of the second corner portion is formed by two straight lines, and an angle of the sharp corner formed by the two straight lines is greater than an angle of the sharp corner of the third corner portion.

In some embodiments, an orthographic projection of the sharp corner of the second corner portion on the first base substrate is in an arc shape; and an angle formed by tangent lines of the arc is equal to an angle of the sharp corner of the third corner portion.

According to some embodiments of the present disclosure, a display device is provided. The display device includes a power supply assembly, and a display panel as described above, wherein the power supply assembly is coupled to the display panel and is configured to supply power to the display panel.

BRIEF DESCRIPTION OF DRAWINGS

In order to describe the technical solutions in the embodiments of the present disclosure more clearly, the following briefly describes the accompanying drawings required for describing the embodiments. Apparently, the accompanying drawings in the following description show merely some embodiments of the present disclosure, and those of ordinary skill in the art can still derive other drawings from these accompanying drawings without creative efforts.

DETAILED DESCRIPTION

Figure 1:
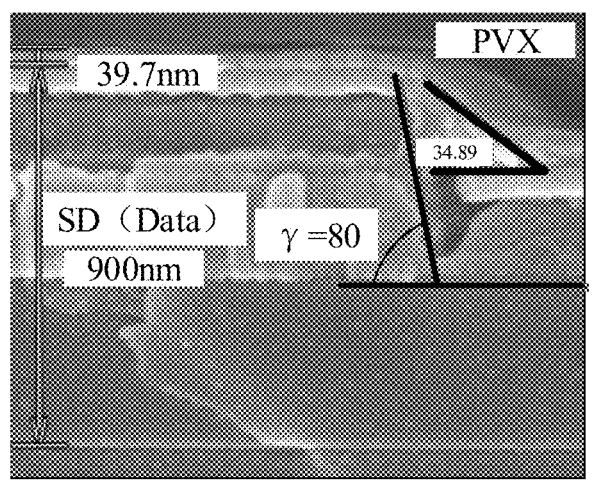
FIG. 1 is a schematic diagram of a film layer structure of a display panel according to some embodiments of the present disclosure.

In order to make the objects, technical solutions and advantages of the present disclosure clearer, embodiments of the present disclosure are described in further detail below in conjunction with the accompanying drawings.

In some practices, an LCD panel typically includes a color film substrate and an array substrate that are disposed relative to each other, and a liquid crystal layer disposed between the color film substrate and the array substrate. The array substrate includes a substrate, and a gate line, a data line, and a sub-pixel disposed on a side of the substrate. The sub-pixel includes a pixel electrode. The color film substrate includes a substrate, and a black matrix (BM) layer disposed on a side of the substrate. The BM layer is configured to block the data line and the gate line to avoid light leakage. Moreover, a double-domain 1P2D structure is mostly used in current pixel electrodes, that is, a pixel electrode generally includes two domains, and a corner portion connecting the two domains. Accordingly, the data line and the BM disposed on a side of the corner portion of the pixel electrode need to be arranged in a shape having a corner portion, so as to facilitate layout of the pixel electrodes.

However, due to influence of the process and restriction of the size of the LCD panel, the current BM layer fails to effectively block the position where the corner portion of the data line is disposed, and consequently the LCD panel is still subject to light leakage and thus has a poor display effect.

Based on the above technology, it is known that the pixel electrodes in the sub-pixels are mostly selected in a 1P2D double-domain structure, so as to reduce the risk of color deviation and strips in LCD panels. The 1P2D structure is often applied in small-size LCD wearable products such as wearable watches. Currently, for a sub-pixel with a 1P2D structure and a corner portion, the data line connected to it, as described in the background technology, is correspondingly provided with a structure similar to the 1P2D structure. That is, the data line also has corner portions. Moreover, in one horizontal direction, the angle of the sharp corner of the corner portion of the data line is equal to the angle of the sharp corner of the corner portion of the pixel electrode, and accordingly, a shielding layer (e.g., a BM) for shielding is dimensionally extended based on the shape of the data line in order to ensure shielding of the data line.

However, on one hand, the current fixed extension leads to insufficient shielding of light leakage at the sharp corners of the data lines by the BM, resulting in serious light leakage in the dark state (powered & unpowered), which leads to low CR. CR is the luminance contrast value of L255 white screen and L0 black screen with poor display effect. Moreover, for high PPI LCD products, in the case that the dual gate design is used, the opening region is reduced accordingly, and the proportion of dark region at the sharp corners of the data line is larger, with poorer light effect, resulting in lower display brightness, which also leads to low CR. PPI (per pixel inch) is the unit of resolution, referring to the quantity of sub-pixels per inch in the LCD panel. Accordingly, high PPI means high resolution.

On the other hand, in conjunction with FIG. 1, a passivation layer (PVX) is disposed on the side of the data line to protect the data line. Because the data line is generally disposed in the same layer with the source & drain (SD) metal layer, as shown in FIG. 1, passivation layer can be disposed on a side of the source & drain metal layer. However, it has been found that the lower thickness of PVX has lower protection for the data line, and the data line still has the risk of being scratched. For this reason, a pure metal (e.g., molybdenum) with high hardness and strong scratch resistance can be selected to form the data line, i.e., the material of the data line can include pure metal Mo. However, referring to FIG. 1, affected by the material's characteristics, the data line formed has a Taper angle γ about 80°. This large Taper angle is not favorable to the coating of the PI liquid for orienting the liquid crystal molecules in the liquid crystal layer, i.e., it is not favorable to the liquid crystal orientation, which leads to the phenomenon of disordered liquid crystal orientation in the vicinity of the Taper angle, and still causes light leakage. Furthermore, the thicknesses of some of the film layers, such as 39.7 nm and 900 nm, are schematically shown in FIG. 1, as well as the angle between another film layer and a film layer other than the Taper corner, and the angle is 34.89°.

On the other hand, the current angle α between the sharp corner of the data line (i.e., the source & drain metal layer) and the horizontal direction is about 45° to 50°, and this smaller angle causes the metal forming the data line to diffract the incident polarized light, which still results in the light leakage phenomenon. Exemplarily, taking α as 45° as an example, it can be seen in conjunction with the schematic diagram illustrated in FIG. 2 that the LCD panel generally also includes a lower polarizer (POL) and an upper POL disposed on both sides of the array substrate and the color film substrate. The transmittance axis of the lower POL is 0°, and an absorption axis of the lower POL is 90°, while a transmittance rate of the upper POL is 90°, and an absorption axis of the upper POL is 0°. Under the above conditions, in the case that the incident polarized light (identified as Exy) passes through the data line, the vibration direction of P-wave inside the display panel becomes vertical, perpendicular to the display panel, resulting in that only the S-wave is remained. This S-wave is decomposed into a component in the direction of the upper POL transmission axis (90°), which can be called the unpolarized quantity (identified as Exy'), and this unpolarized quantity Exy' generates light leakage through the upper POL. In addition, Exy' satisfies: Exy'=Exy*Cos α*Sin α=½*Exy*Sin 2α. i.e., Exy'∝ Sin 2α. Exy' is largest in the case that α is 45°, and accordingly, the light leakage is most severe.

Figure 2:
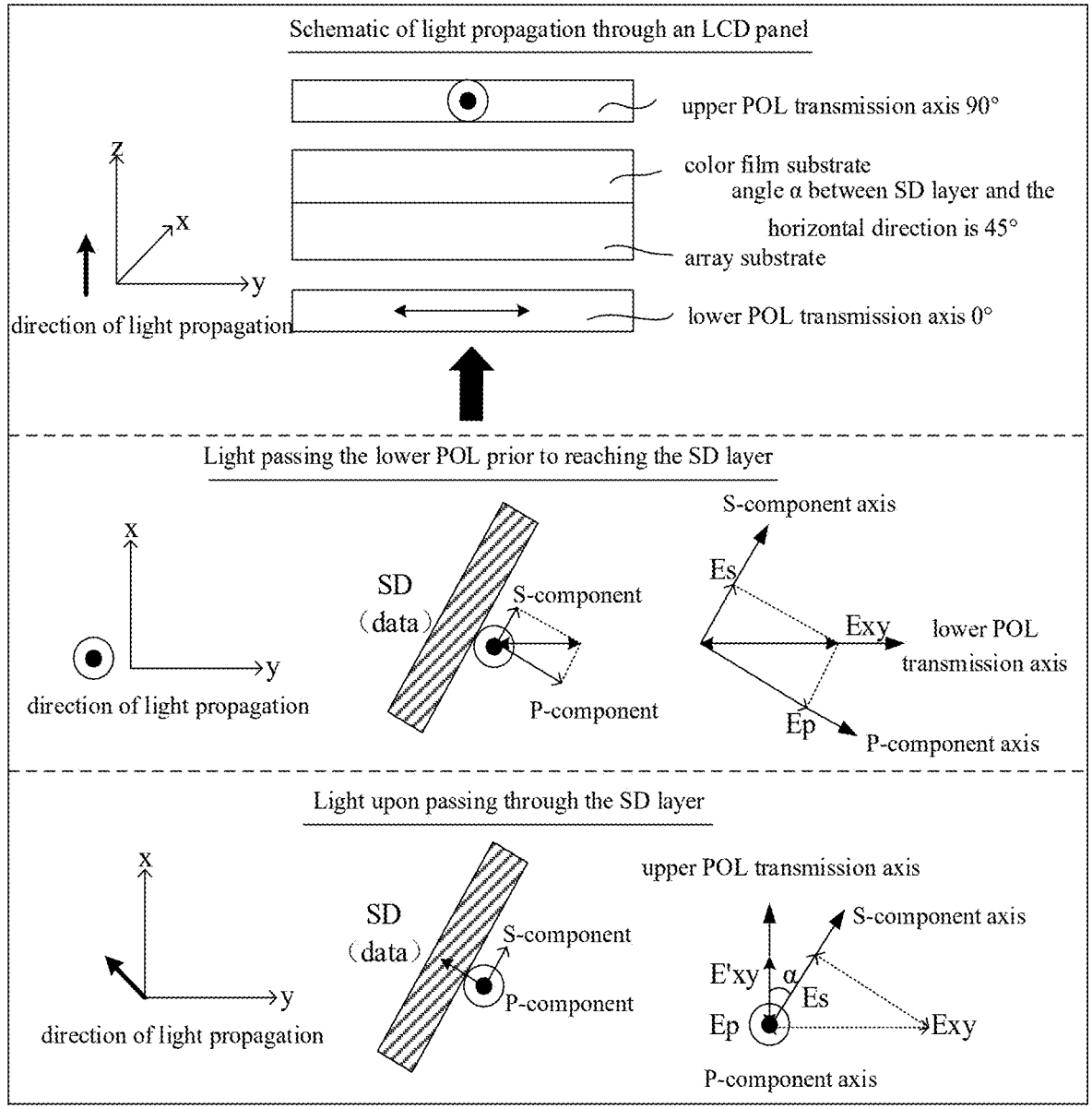
FIG. 2 is a schematic diagram of a principle of diffraction of light according to some embodiments of the present disclosure.

It should be noted that FIG. 2 illustrates a schematic diagram of the propagation of light through the LCD panel, a schematic diagram of the propagation of light through the lower POL prior to reaching the source & drain metal layer, and a schematic diagram of the propagation of light upon passing through the source & drain metal layer. In the figure, the S component axis indicates the S wave, the P component axis indicates the P wave, Es indicates the S wave, and Ep indicates the P wave. As can be seen from FIG. 2, in the case that the light passes through the source & drain metal layer SD, diffraction occurs under the influence of α, resulting in a change in the direction of light propagation.

It should also be noted that the above light leakage is mostly seen in high PPI, 1P2D pixel structure and/or dual-gate advanced dimension switch (ADS) type LCD products, and is commonly seen when the LCD product is in a dark state. Based on this, embodiments of the present disclosure provide a display panel that can solve the problem of low CR and serious light leakage due to the above various reasons, having a better display effect.

Figure 3:
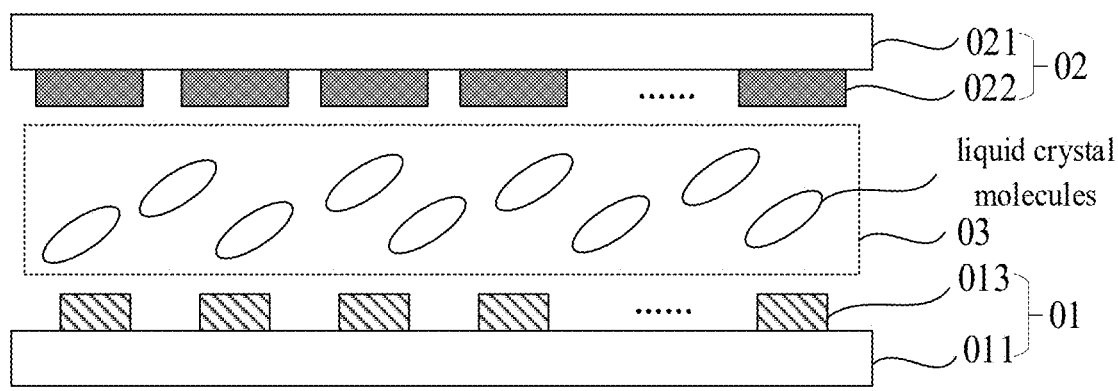
FIG. 3 is a schematic diagram of a film layer structure in another display panel according to some embodiments of the present disclosure.
Figure 4:
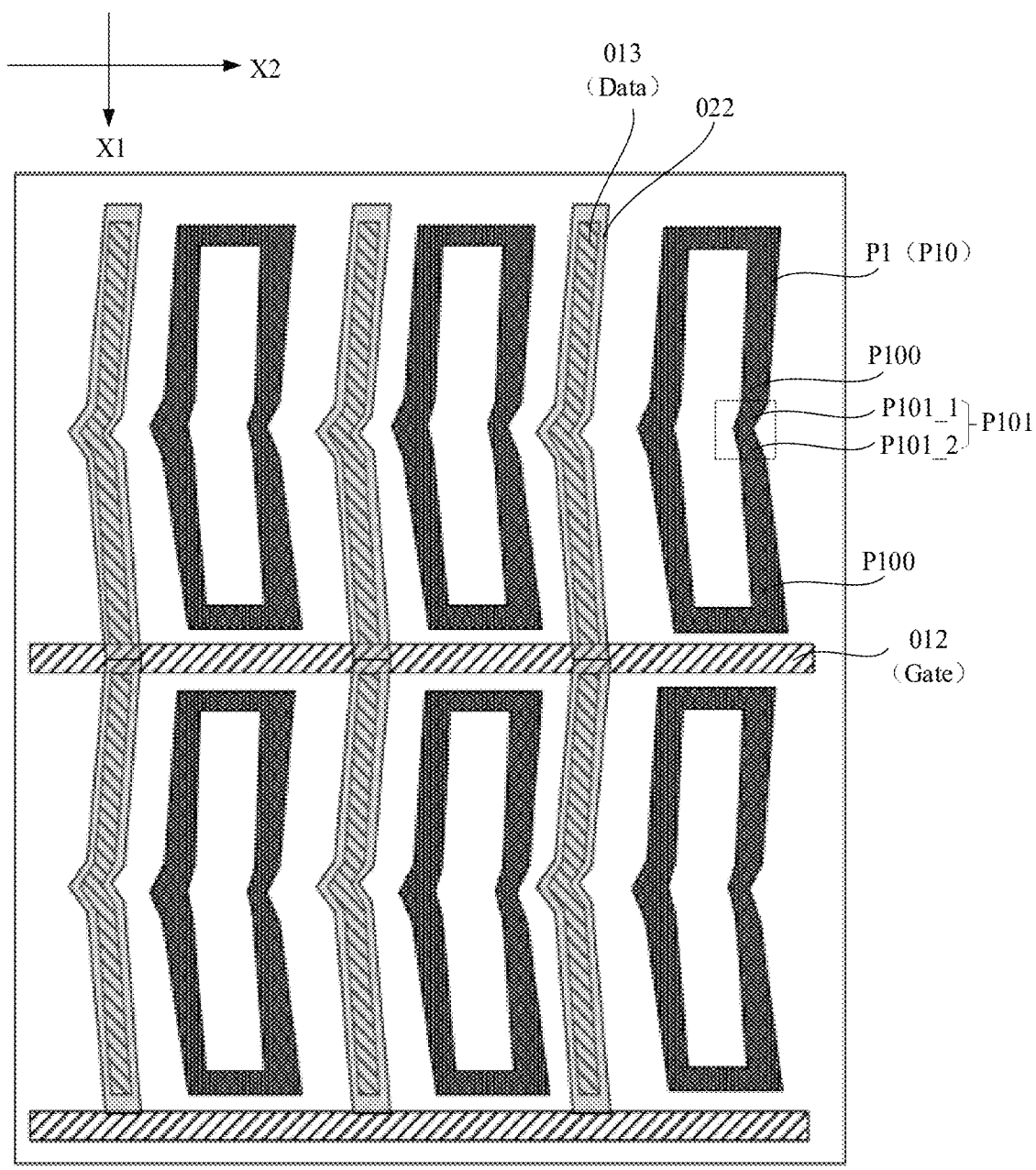
FIG. 4 is a schematic diagram of a plane of a display panel according to some embodiments of the present disclosure.

FIG. 3 is a schematic diagram of a film layer structure of a display panel according to some embodiments of the present disclosure. FIG. 4 is a schematic diagram of a plane of a display panel according to some embodiments of the present disclosure. As can be seen with reference to FIGS. 3 and 4, the display panel documented in the embodiments of the present disclosure includes a first substrate 01 and a second substrate 02 disposed opposite to each other, and a liquid crystal layer 03 disposed between the first substrate 01 and the second substrate 02. The liquid crystal layer 03 includes a plurality of liquid crystal molecules.

The first substrate 01 includes a first base substrate 011, and a plurality of first signal lines 012 and a plurality of second signal lines 013 disposed on a side, close to the second substrate 02, of the first base substrate 011.

Moreover, the plurality of first signal lines 012 are spaced apart in a first direction X1, and the plurality of second signal lines 013 are spaced apart in a second direction X2. Two adjacent first signal lines 012 are insulatively intersected with two adjacent second signal lines 013 to define a subpixel P1, which includes a pixel electrode P10. In addition, the subpixel P1 includes a common electrode, and the liquid crystal molecules are deflected by a pressure difference between the pixel electrode P10 and the common electrode, thereby causing light to be emitted through the liquid crystal layer 03, and the display side of the LCD panel reliably displays a picture.

The first direction X1 intersects with the second direction X2, i.e., is not parallel with the second direction X2. For example, with reference to FIG. 4, the first direction X1 and the second direction X2 are shown to be perpendicular to each other. On this basis, continuing to refer to FIG. 4, it can also be seen that the plurality of sub-pixels PI defined by the plurality of first signal lines 012 and the plurality of second signal lines 013 are arranged in an array. That is, the first substrate 01 includes a plurality of rows and a plurality of columns of sub-pixels P1. In some embodiments, the first direction X1 is in a row direction (longitudinal) and the second direction X2 is in a column direction (horizontal).

In some embodiments, the first signal line 012 is a gate line Gate as described in the above embodiments, and the second signal line 013 is a data line Data as described in the above embodiments. The gate line provides a gate drive signal to the sub-pixels P1, and the data line provides a data signal to the sub-pixels P1, thereby charging the pixel electrodes P10. Accordingly, it is also known that the first data line 012 and the second signal line 013 are coupled (i.e., electrically connected) to the sub-pixel P1. The coupling relationship is not shown in FIG. 4. As well, the first signal line 012 and the sub-pixel PI are not shown in FIG. 3.

With continued reference to FIGS. 3 and 4, it can be seen that the second substrate 02 includes a second base substrate 021, and a shielding layer 022 disposed on the side, close to the first substrate 01, of the second base substrate 021. In this way, in the LCD panel, the first substrate 01 is referred to as an array substrate, and the second substrate 02 is referred to as a color film substrate.

Moreover, the orthographic projection of the shielding layer 022 on the first base substrate 011 covers the orthographic projection of the first signal line 012 on the first base substrate 011, and covers the orthographic projection of the second signal line 013 on the first base substrate 011. In this way, effective shielding of the first signal line 012 and the second signal line 013 can be realized to avoid light leakage. In some embodiments, as described in the above embodiments, the shielding layer 022 is a black matrix layer.

It should be noted that the first base substrate 011 and the second base substrate 021 are not shown in FIG. 4. Both FIG. 3 and FIG. 4 only schematically show the positional relationship between the shielding layer 022 and the second signal line 013, and do not show the shielding layer 022 covering the first signal line 012.

Continuing to refer to FIG. 4, it can be seen that in the first direction X1, the pixel electrode P10 has at least two domains P100, and a first corner portion P101 connecting two adjacent domains P100. The pixel electrode P10 illustrated in the figure has two domains P100, and the structure of the sub-pixel PI including the pixel electrode P10 is a dual domain pixel structure of 1P2D. As can also be seen with reference to the accompanying figures, the extension directions of two adjacent domains P100 are different. The first corner portion P101 includes two portions P101_1 and P101_2 with different extension directions, and the two portions P101_1 and P101_2 form a sharp corner with an opening facing right. It should be noted that only one type of pixel electrode P10 is schematically illustrated herein.

Figure 5:
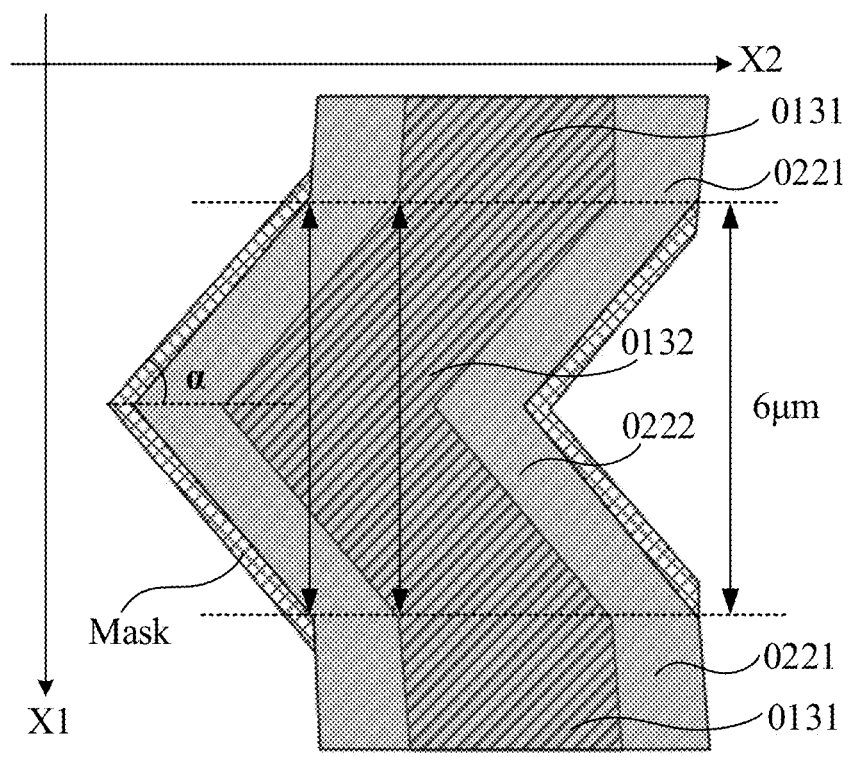
FIG. 5 is a schematic diagram of a partially enlarged structure of a signal line and a shielding layer according to some embodiments of the present disclosure.

Continuing with the partially enlarged schematic shown in FIGS. 4 and 5, it can be seen that based on the structure of the above pixel electrode P10, the second signal line 013 has at least two line body portions 0131 one-to-one corresponding to the at least two domains P100, and a second corner portion 0132 corresponding to the first corner portion P101 and connecting the two adjacent line body portions 0131. The portion of the shielding layer 022 covering the second signal line 013 has at least two shielding body portions 0221 one-to-one corresponding to the at least two domains P100, and a third corner portion 0222 corresponding to the first corner portion P101 and connecting the adjacent two shielding body portions 0221. In the case that the pixel electrode P10 includes two domains P100, the second signal line 013 includes two line body portions 0131, the portion of the shielding layer 022 covering the second signal line 013 has two shielding body portions 0221. It is to be noted that one-to-one corresponding herein indicates that on a same horizontal line in the second direction X2, the corresponding two portions are disposed at approximately one position, on a same horizontal line in the first direction X1, the corresponding two portions extend in approximately one direction, the sharp corners of the corresponding individual corner portions face one direction, and in the second direction X2, the sharp corners of the corresponding corner portions are disposed on a same horizontal line.

In some embodiments, in some embodiments of the present disclosure, as shown in FIG. 5, in the first direction X1, the shielding layer 022 of the third corner portion 0222 is aligned (i.e., overlapped) with the top and bottom sides of the second signal line 013 of the second corner portion 0132, that is, the heights of the third corner portion 0222 is equal to the height of the second corner portion 0132 and is about 6 μm. With this arrangement, although the positional relationship of coverage is also satisfied, reliable coverage of the second signal line 013 cannot be achieved, and more serious light leakage still exists at the aligned position. FIG. 5 also schematically identifies the angle α recorded in the above embodiments, and the mask plate Mask forming the second signal line 013.

Figure 6:
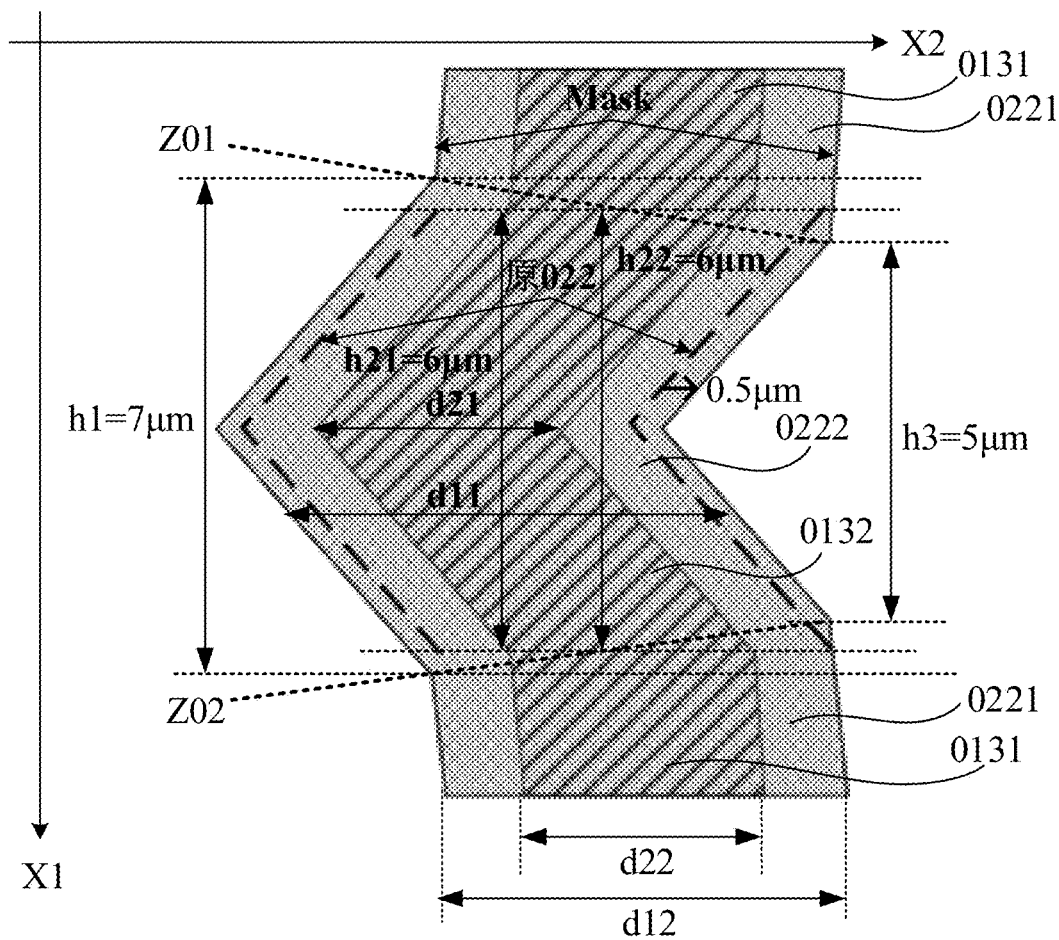
FIG. 6 is a schematic diagram of a partially enlarged structure of another signal line and shielding layer according to some embodiments of the present disclosure.

And in the embodiments of the present disclosure, with reference to FIG. 6, it can be seen that the shielding layer 022, in addition to covering the second signal line 013, the area of the orthographic projection of the second corner portion 0132 of the second signal line 013 is smaller than the area of the orthographic projection of the third corner portion 0222 of the shielding layer 022 on the first base substrate 011. As well, the orthographic projection of the second corner portion 0132 on the first base substrate 011 is within the orthographic projection of the third corner portion 0222 on the first base substrate 011.

It is to be noted, in conjunction with FIG. 6, the area of the orthographic projection of either of the second corner portion 0132 and the third corner portion 0222 on the first base substrate 011 is the area occupied by the orthographic projection of the region surrounded by a plurality of ends of the corner portion (six ends are shown in the figure) on the first base substrate 011. For example, taking the third corner portion 0222 as an example, the area of its orthographic projection on the first base substrate 011 indicates that the area of the region of the orthographic projection on the first base substrate 011 enclosed by the edge of the third corner portion 0222 far away from the left side of the pixel electrode P10 (including the upper end, the lower end, and the sharp end for a total of three ends), the edge of the third corner portion 0222 close to the right side of the pixel electrode P10 (including the upper end, the lower end, and the sharp end for a total of three ends), the line Z01 connecting the two upper ends, and the line Z02 connecting the two lower ends. The area of the second corner portion 0132 is the same.

As can be seen on this basis, it can also be seen in conjunction with FIG. 6 that the upper and lower ends of the second corner portion 0132 are disposed between the left side, distal from the left side of the pixel electrode P10, of the third corner portion 0222 and the right side, close to the right side of the pixel electrode P10, of the third corner portion 0222. The upper and lower ends of the second corner portion 0132 distal from the left side of the pixel electrode P10 are disposed at the upper and lower ends of the third corner portion 0222 distal from the left side of the pixel electrode P10. P10. The upper end and the lower end of the third corner portion 0222 close to the side where the right side of the pixel electrode P10 is disposed are disposed between the upper end and the lower end of the second corner portion 0132 close to the side where the right side of the pixel electrode P10 is disposed. Further, the orthographic projection of the second corner portion 0132 on the first base substrate 011 being within the orthographic projection of the third corner portion 0222 on the first base substrate 011 indicates that, unlike FIG. 6, the upper and lower ends of the second corner portion 0132 close to the right side where the pixel electrode P10 is disposed are disposed between the upper and lower ends of the third corner portion 0222 close to the right side where the pixel electrode P10 is disposed.

That is, as shown in FIG. 6, each side of the second corner portion 0132 of the second signal line 013 is not aligned (i.e., not overlapped) with each side of the third corner portion 0222 of the shielding layer 022. In this way, relative to the structure shown in FIG. 5, it is possible to make the third corner portion 0222 of the shielding layer 022 cover the second corner portion 0132 of the second signal line 013 as fully as possible. That is, at the corner position, the second signal line 013 can be effectively shielded. Accordingly, the light leakage at the sharp corners of the second signal line 013 can be reliably reduced without changing the electrical performance of the panel, ensuring a better display effect of the display panel.

In summary, embodiments of the present disclosure provide a display panel. The display panel includes a first substrate and a second substrate disposed opposite to each other. The first substrate includes a base substrate, and a first signal line, a second signal line, and a sub-pixel having a pixel electrode disposed on a side of the base substrate. The second substrate includes a base substrate, and a shielding layer disposed on a side of the base substrate. The pixel electrode, the second signal line, and the shielding layer all have at least two body portions, and corner portions connecting two adjacent body portions. Because not only the shielding layer covers the first signal line and the second signal line, but also the area of the corner portion of the second signal line is smaller than the area of the corner portion of the shielding layer, and the orthographic projection of the corner portion of the second signal line on the base substrate is within the orthographic projection of the corner portion of the shielding layer on the base substrate, it is possible to ensure that the shielding layer adequately shields the signal line, so as to reliably reduce the light leakage, and providing a better display effect.

In some embodiments, it can also be seen in conjunction with FIGS. 4 and 6 that in the first direction X1, the height h1 of the side (shown on the left side), away from the pixel electrode P10, of the third corner portion 0222 is greater than the height h21 of the side, away from the pixel electrode P10, of the second corner portion 0132, and the height h3 of the side (shown on the right side), close to the pixel electrode P10, of the third corner portion 0222 is less than the height h22 of the side, close to the pixel electrode P10, of the second corner portion 0132. It can also be seen that the height h1 of the side, away from the pixel electrode P10, of the third corner portion 0222 is greater than the height h3 of the side, close to the pixel electrode P10, of the third corner portion 0222.

In some embodiments, continuing in conjunction with FIGS. 4 and 6, it can also be seen that the height h22 of the side, close to the pixel electrode P10, of the second corner portion 0132 is the same as the height h21 of the side, away from the pixel electrode P10, of the second corner portion 0132 in the first direction X1. The difference between the height h1 of the side, away from the pixel electrode P10, of the third corner portion 0222 and the height h21 of the side, away from the pixel electrode P10, of the second corner portion 0132 ranges from 0 to 1 μm, i.e., $0<h1-h21\leq 1$ μm. The difference between the height h3 of the side, close to the pixel electrode P10, of the third corner portion 0222 is the same as the height h22 of the side, close to the pixel electrode P10, of the second corner portion 0132. The difference between the height h22 of the side, close to the pixel electrode P10, of the third corner portion 0222 and the height h22 of the side, close to the pixel electrode P10, of the second corner portion 0132 ranges from 0 to 1 μm, i.e., $0<h3-h22\leq 1$ μm.

For example, assuming the same structure as that shown in FIG. 5 above, the height h22 of the side, close to the pixel electrode P10, of the second corner portion 0132 and the height h21 of the side, away from the pixel electrode P10, of the second corner portion 0132 are 6 μm. That is, the height of the second corner portion 0132 is 6 μm. In the case that the range of values of the difference in widths as described in the above embodiments, the height h1 of the side, away from the pixel electrode P10, of the third corner portion 0222 is greater than 6 μm and less than or equal to 7 μm, the height h3 of the side, close to the pixel electrode P10, of the third corner portion 0222 is less than 6 μm and greater than or equal to 5 μm. That is, the height h1 of the side, away from the pixel electrode P10, of the third corner portion 0222 illustrated in FIG. 6 equals 7 μm, the height h3 of the side, close to the pixel electrode, of the third corner portion 0222 equals 5 μm. It should be noted that FIG. 6 also schematically identifies the original shielding layer 022 and Mask based on FIG. 5. In comparison with FIG. 5, the structure shown in FIG. 6 can be considered as follows: in the second direction X2, both sides (i.e., the boundary line) of the third corner portion 0222 are expanded, and the height of the left side is stretched to 7 μm upon expanding the left side, and the height of the right side is stretched to 5 μm upon expanding the right side. In this way, the second corner portion 0132 of the second signal line 013 can be made to be disposed as far as possible within the third corner portion 0222 of the shielding layer 022, enhancing the wrapping of the shielding layer 022 around the sharp corners of the second signal line 013, and reducing the risk of light leakage occurring at the sharp corners.

It is to be noted that because the height h22 of the side, close to the pixel electrode P10, of the second corner portion 0132 is the same as the height h21 of the side, away from the pixel electrode P10, of the second corner portion 0132 in the first direction X1. In the following embodiments and the accompanying drawings, the heights h21 and h22 are uniformly identified as h2.

In some embodiments, with continued reference to FIG. 6, it can be seen that the width of the shielding layer 022 is greater than the width of the second signal line 013 in the second direction X2. This design is also intended to enhance the wrapping of the shielding layer 022 around the sharp corners of the second signal line 013.

Moreover, the width d11 of the third corner portion 0222 included in the shielding layer 022 is greater than the width d12 of the shielding body portion 0221, and the width d21 of the second corner portion 0132 included in the second signal line 013 is equal to the width d22 of the line body portion 0131. Without changing the horizontal width d12 in the second direction X2 of the shading body portion 0221 corresponding to the two domains of the pixel electrode P10 in the shielding layer 022, the expansion of the third corner portion 0222 of the shielding layer 022 in the first direction X1 is realized. In some embodiments, it can also be seen in conjunction with FIG. 6 that the width of the shielding body portion 0221 can be the same as the width of the mask plate Mask in the second direction X2.

In some embodiments, in the second direction X2, the difference between the width d12 of the shielding body portion 0221 and the width d22 of the line body portion 0131 ranges from 2 μm' to 3 μm, i.e., $2 \mu m<d12-d22\leq 3$ μm. The difference between the width d11 of the third corner portion 0222 and the width d21 of the second corner portion 0132 ranges from 3 μm to 4 μm, i.e., $3 \mu m<d11-d21\leq 4$ μm.

Exemplarily, in the structure shown in FIG. 6, in the second direction X2, the width d21 of the second corner portion 0132 and the width d22 of the line body portion 0131 of the second signal line 013 are 3 μm. In the case that the range of difference values of the widths documented in the above embodiments is satisfied, the width d12 of the shielding body portion 0221 in the shielding layer 022 ranges from 5 µm to 6 µm, i.e., the width d12 is greater than 5 µm and is less than or equal to 6 µm. The width d11 of the third corner portion 0222 included in the shielding layer 022 ranges from 6 µm and 7 µm, i.e., the width d11 is greater than 6 µm and is less than or equal to 7 µm.

In some embodiments, with continued reference to FIG. 6, it can be seen that in the second direction X2, the width of the third corner portion 0222 of the shielding layer 022 at the sharp corner is equal to the width at any of the other places other than the sharp corner. That is, in the case that the boundary line of the third corner portion 0222 is expanded as described in the above embodiments, any point of the boundary line is expanded in the first direction X1 (including the upper end, the sharp corner end, and the lower end), rather than just stretching the height of the boundary line. In this way, the coverage of the shielding layer 022 can be further expanded with respect to only stretching the height of the boundary line, thereby further improving the problem of uneven shielding on both sides caused by the shielding layer 022 when the alignment of the shielding layer 022 is shifted in the second direction X2.

Exemplarily, in the case that the boundary line of the third corner portion 0222 of the shielding layer 022 is expanded in the second direction X2, the boundary line is uniformly expanded at any point of the boundary line by 0 to 0.5 µm. The third corner portion 0222 illustrated in FIG. 6 is expanded by 0.5 µm with respect to the third corner portion 0222 of the original shielding layer 022.

It should be noted that in the second direction X2, the direction of either the outward expansion or the outward extension with respect to the boundary line of the third corner portion 0222 refers to the direction distal from the second corner portion 0132 having the second signal line 013.

Figure 7:
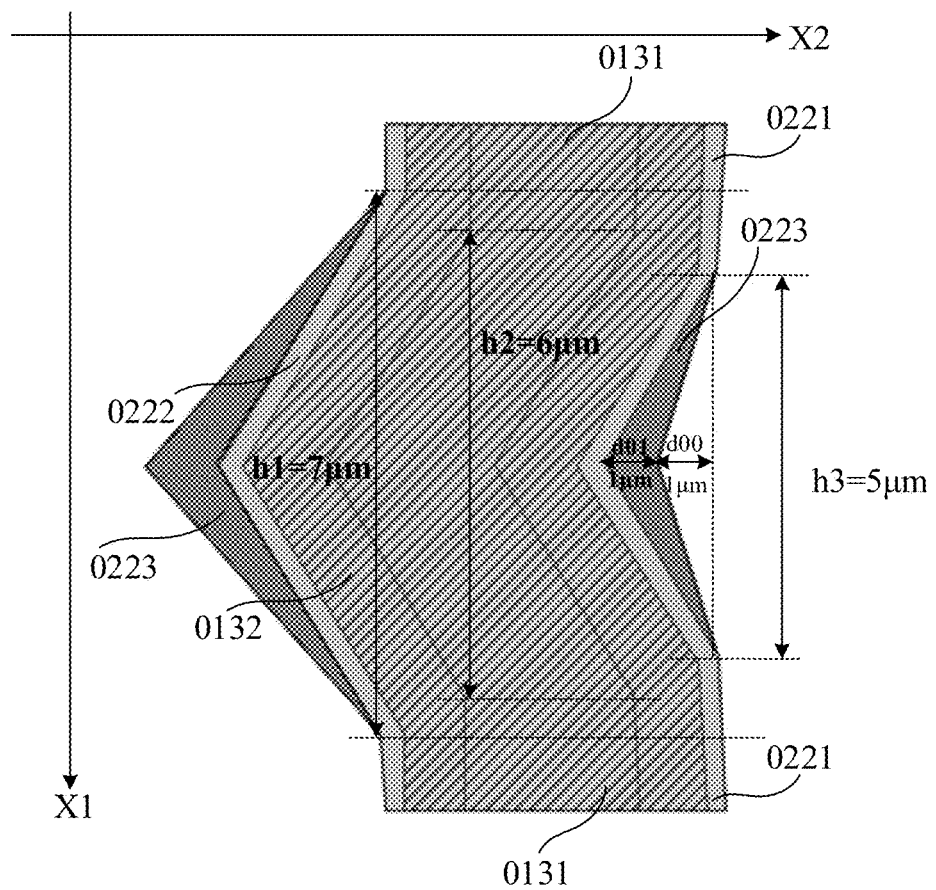
FIG. 7 is a schematic diagram of a partially enlarged structure of still another signal line and shielding layer according to some embodiments of the present disclosure.

In some embodiments, FIG. 7 is a schematic diagram of the structure of still another signal line and shielding layer according to some embodiments of the present disclosure. As shown in FIG. 7, in the second direction X2, the shielding layer 022 has an auxiliary shielding portion 0223 disposed on at least one of the two sides of the third corner portion 0222, and the auxiliary shielding portion 0223 is close to at least one side of the third corner portion 0222.

Exemplarily, in the structure illustrated in FIG. 7, the auxiliary shielding portion 0223 is adjacent to both sides of the third corner portion 0222. In some embodiments, the auxiliary shielding portion 0223 is a black matrix layer. By providing the auxiliary shielding portion 0223, the coverage of the shielding layer 022 is further expanded to ensure adequate shielding of the second corner portion 0132 of the second signal line 013, and to reduce the risk of light leakage.

In some embodiments, with continued reference to FIG. 7, it can be seen that in the first direction X1, the two ends of the auxiliary shielding portion 0223 is overlapped with the two ends of the third corner portion 0222. Moreover, a side, close to the third corner portion 0222, of the auxiliary shielding portion 0223 is overlapped with a side, close to the auxiliary shielding portion 0223, of the third corner portion 0222. The orthographic projection of the side, distal from the third corner portion 0222, of the auxiliary shielding portion 0223 on the second base substrate 021 is curved or linear. That is, the orthographic projection of the auxiliary shielding portion 0223 on the second base substrate 021 is a figure surrounded by a line, or is a figure surrounded by a line and a curve.

Exemplarily, as an optional realization, referring to FIG. 7, the orthographic projection of the side, distal from the third corner portion 0222, of the auxiliary shielding portion 0223 illustrated therein on the second base substrate 021 is rectilinear. On this basis, the side, distal from the third corner portion 0222, of the auxiliary shielding portion 0223 includes a first straight line and a second straight line intersected with each other in the extension direction. In the second direction X2, the sharp corners formed by the first straight line and the second straight line is on a same horizontal line as the sharp corners of the third corner portion 0222 and the sharp corners of the second corner portion 0132, and the orientation is the same, in conjunction with FIG. 4, toward the pixel electrode P10.

Figure 8:
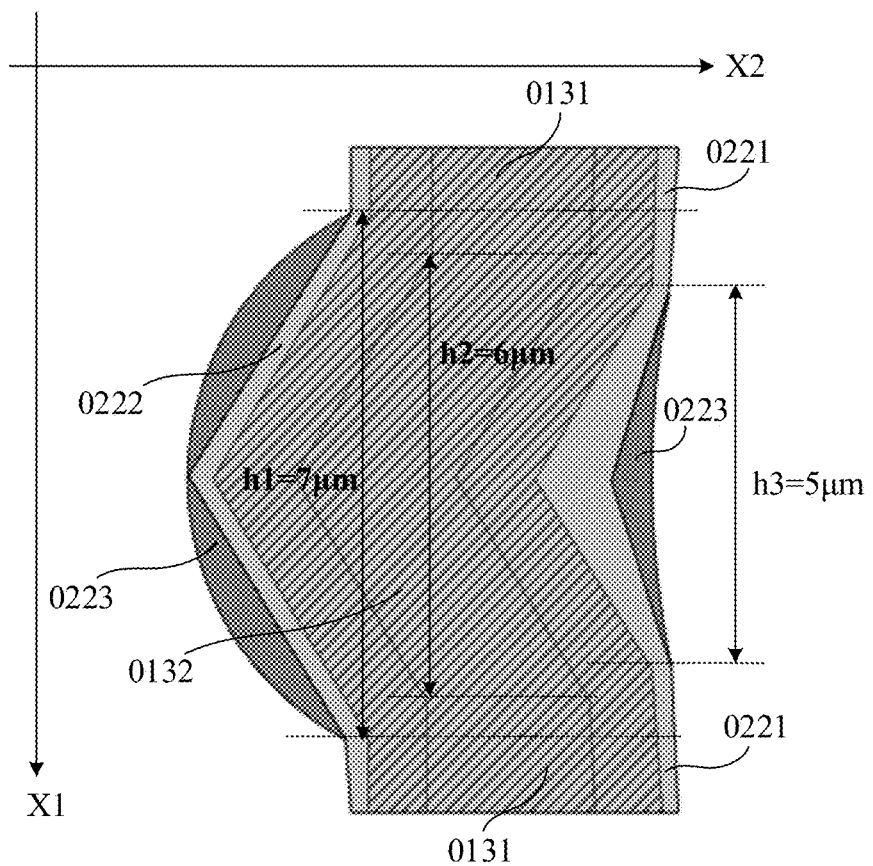
FIG. 8 is a schematic diagram of a partially enlarged structure of still another signal line and shielding layer according to some embodiments of the present disclosure.

Exemplarily, as another optional realization, as can be seen with reference to the schematic diagram of the structure of the alternative signal line and shielding layer illustrated in FIG. 8, the orthographic projection of the side, distal from the third corner portion 0222, of the auxiliary shielding portion 0223 on the second base substrate 021 is curvilinear. On this basis, the side, distal from the third corner portion 0222, of the auxiliary shielding portion 0223 includes a curve. Moreover, in the second direction X2, the concave point of the curve is on a same horizontal line as the sharp corners of the third corner portion 0222 and the sharp corners of the second corner portion 0132, and the concave direction of the curve is in the same direction as the orientation direction of the sharp corners of the third corner portion 0222 and the orientation direction of the sharp corners of the second corner portion 0132.

In some embodiments, in some embodiments, in conjunction with FIG. 8, for the auxiliary shielding portion 0223 disposed on the side, away from the pixel electrode P10, of the third corner portion 0222, the concave point of the curve included in the auxiliary shielding portion 0223 is connected to, i.e., is aligned with, the sharp corners of the third corner portion 0222. In this way, a better opening ratio of the display panel can be ensured.

It should be noted that FIG. 7 is only a schematic illustration for the straight type, and FIG. 8 is only a schematic illustration for the curved type. The structure of the straight and curved type is not limited. As well, in conjunction with FIGS. 7 and 8, the auxiliary shielding portion 02 is referred to as a transverse supplement or an arc (also referred to as a complementary rounded corner) added on the left and right sides or on a single side of the third corner portion 0222.

In some embodiments, in some embodiments, as can be seen with continued reference to FIG. 7, the maximum depth d01 of the auxiliary shielding portion 0223 in the second direction X2 ranges from 0.5 to 1 times the target depth d00. The target depth is the depth of the side, close to the pixel electrode P10, of the sharp corner of the third corner portion 0222. That is, the depth of the transverse supplement ranges from 0.5 to 1 times the depth of the sharp corner. In the structure illustrated in FIG. 7, the target depth d00 is 1 µm, and the maximum depth d01 of the auxiliary shielding portion 0223 is 1 times the target depth d00, i.e., 1 µm.

It should be noted that the depth of the sharp corner here is a distance between a sharp corner of the side, close to the pixel electrode P10, of the third corner portion 0222 and an extension line of the shielding body portion 0221 in its extension direction.

Figure 9:
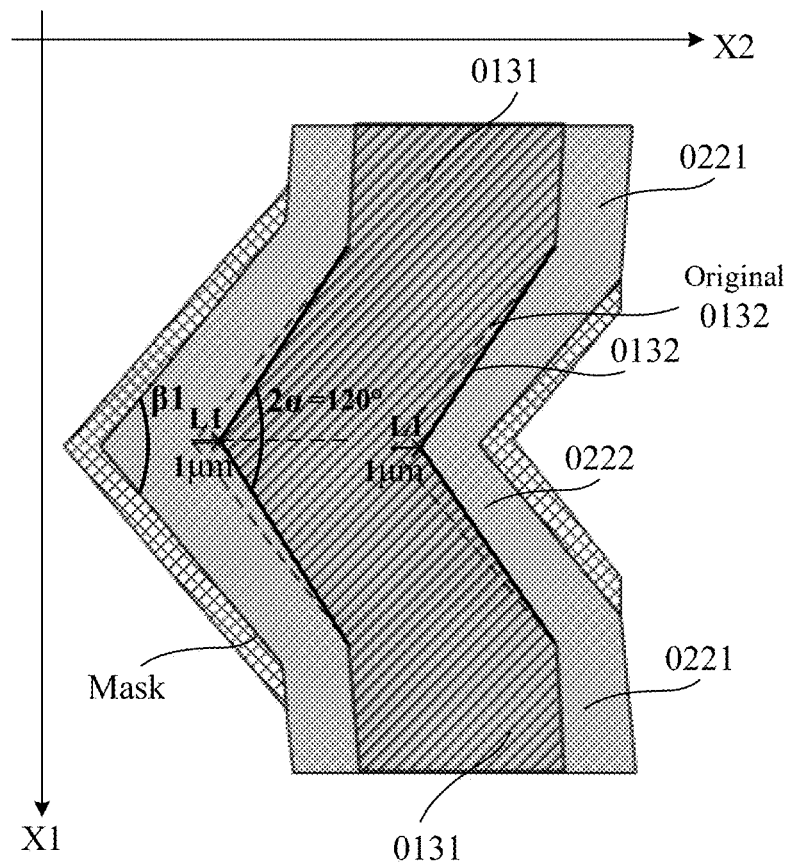
FIG. 9 is a schematic diagram of a partially enlarged structure of still another signal line and shielding layer according to some embodiments of the present disclosure.

In some embodiments, FIG. 9 is a schematic diagram of a structure of a further signal line and a shielding layer according to some embodiments of the present disclosure. As shown in FIG. 9, in the embodiments of the present disclosure, the angle 2α of the sharp corner of the second corner portion 0132 ranges from 100° to 170°. That is, the angle 2α is greater than 100° and less than or equal to 170°. In this way, it is possible to make the angle α of the sharp corner of the second corner portion 0132 with the horizontal line greater than 50° and less than or equal to 85°. As can be seen in conjunction with the above illustration of the principle of FIG. 2, by setting the angle α to lie in this range, it is possible to make the amount of depolarization lower, thereby reducing the problem of light leakage due to the smaller angle α. Exemplarily, the angle 2α of the sharp corner of the second corner portion 0132 illustrated in FIG. 9 is 120°. Correspondingly, it can be appreciated that the illustrated angle α is 60°.

It is to be noted that FIG. 9 also schematically illustrates the original second corner portion 0132 in the structure shown in FIG. 5 with an angle of 100°, i.e., a of 50°. As can be seen in comparison to the original second corner portion 0132, the second corner portion 0132 as described in embodiments of the present disclosure can be considered to be inwardly retracted from the sharp corner of the original second corner portion 0132 in order to expand the angle of the sharp corner. Inward retraction indicates inward retraction toward a side close to the pixel electrode P10. Furthermore, the inward retraction distance generally lies between 0 and 1 μm, i.e., the inward retraction distance is greater than 0 and less than or equal to 1 μm. e.g., in the structure shown in FIG. 9, the inward retraction distance L1 is equal to 1 μm.

In some embodiments, as an optional embodiment, the sharp corner of the second corner portion 0132 is formed by two straight lines, i.e., the structure of the second corner portion 0132 is the same as the first corner portion P101 of the pixel electrode P10. Moreover, as described in the above embodiments, the angle of the sharp corner formed by the two straight lines (i.e., the angle 2α of the sharp corner of the second corner portion 0132 in the structure shown in FIG. 9) is greater than the angle β1 of the sharp corner of the third corner portion 0222.

Figure 10:
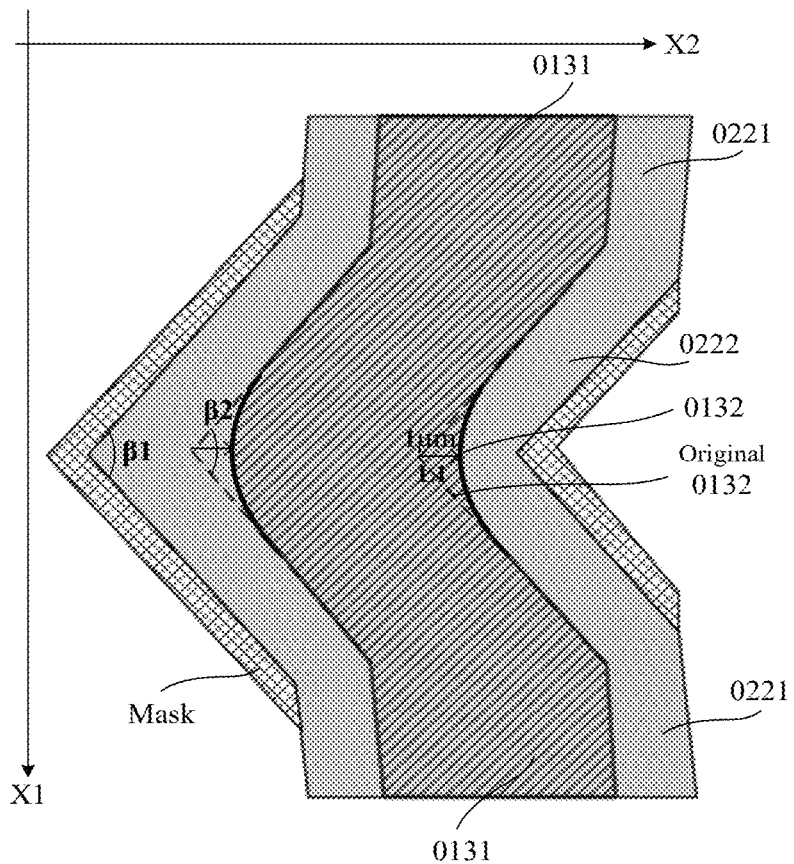
FIG. 10 is a schematic diagram of a structure of still another signal line and shielding layer according to some embodiments of the present disclosure.

Alternatively, as another optional implementation, referring to FIG. 10, the orthographic projection of the sharp corner of the second corner portion 0132 on the first base substrate 011 is an arc. That is, it is also possible to change the second corner portion 0132 from the structure shown in FIG. 5 to the arc shown in FIG. 10 by inward retraction of the sharp corner. Moreover, the angle β2 of the angle formed by the tangent line of the arc is equal to the angle β1 of the sharp corner of the third corner portion 0222. In this way, in conjunction with FIG. 9, it is possible to make the angle 2α of the sharp corner of the second corner portion 0132 in the structure shown in FIG. 10 greater than the angle β1 of the sharp corner of the third corner portion 0222, as described in the above embodiments. In some embodiments, as can be seen by continuing reference with FIG. 10, the inward retraction distance L1 of the sharp corner is approximately 1 μm.

It should be noted that the angles of the sharp corners in the structures shown in FIGS. 9 and 10 include two angles in the second direction X2, disposed to the left side, away from the pixel electrode P10, of the sharp corner and to the right side, close to the pixel electrode P10, of the sharp corner. For example, for the angle β2 formed by the tangent line of the arc, the angle β2 includes both left and right angles. In addition, the structures shown in FIGS. 9 and 10 above are provided under the condition of ensuring that the second signal line 013 is at an effective distance from the common electrode and the pixel electrode P10 in the sub-pixel PI and that the width of the second signal line 013 is greater than a process limit.

Figure 11:
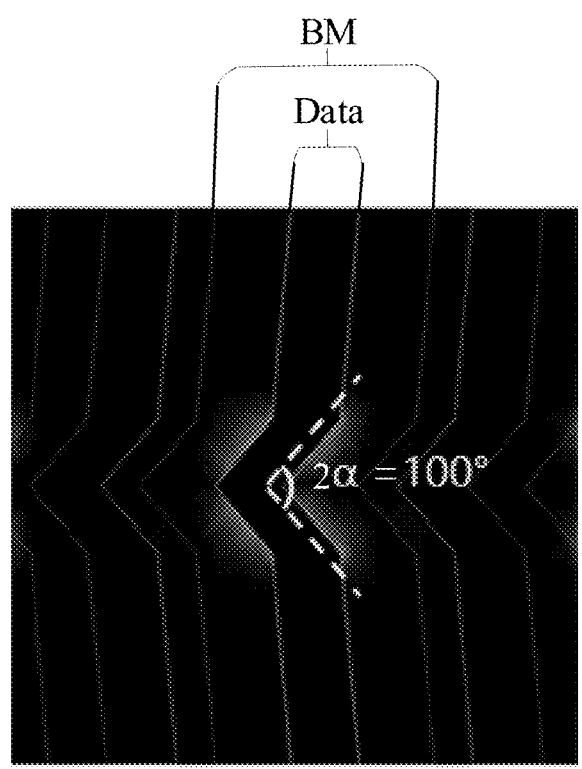
FIG. 11 is a schematic diagram of a light leakage performance according to some embodiments of the present disclosure.
Figure 12:
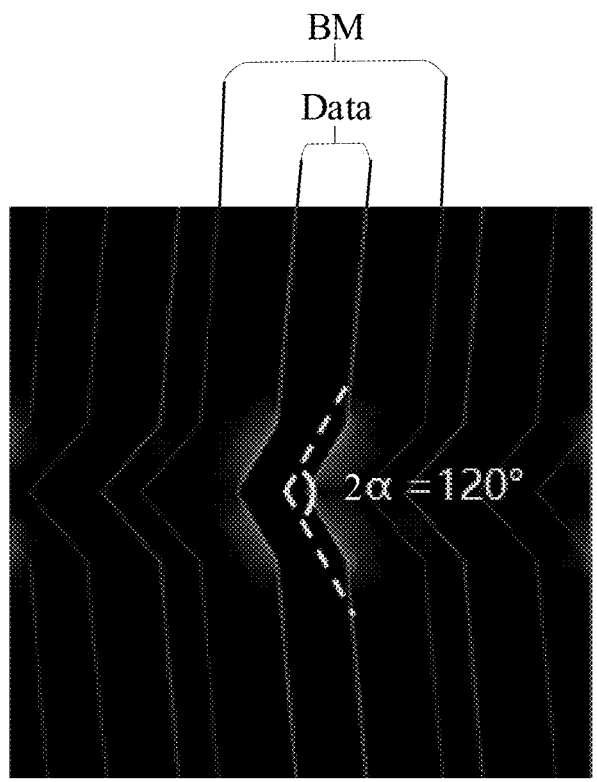
FIG. 12 is a schematic diagram of another light leakage performance according to some embodiments of the present disclosure.

Exemplarily, with the structure shown in FIGS. 5 and 9, i.e., with the angle of the second corner portion 0132 being 100° and 120° as an example, FIGS. 11 and 12 show corresponding simulated diagrams of a light leakage effect. Comparing FIGS. 11 and 12, it can be seen that the light leakage in FIG. 5 at an angle of 100° is more severe than the light leakage in FIG. 9 at an angle of 120°. That is, the light leakage can be reduced by increasing the angle of the corner.

In some embodiments, it has been verified by simulation that based on the structure in which the sharp corner in the second corner portion 0132 shown in FIG. 9 is formed by two straight lines, the light transmittance of the corner at the angle of 120° is $1.01*10^{-5}$, and the light transmittance of the corner at the angle of 100° is $1.38*10^{-5}$. Based on the structure in which the sharp corner of the second corner portion 0132 shown in FIG. 10 is inwardly retracted into an elliptical arc, the light transmittance at the state of inwardly retracted corner is $1.37*10^{-5}$, compared with the light transmittance of the sharp corner at an angle of 100° bring $1.38*10^{-5}$. Therefore, it can be further seen that by the design of the above embodiments of the inward retraction, the light transmittance can be reduced, and the light leakage can be reduced.

Based on the above embodiments, it can be seen that in the embodiments of the present disclosure, the light leakage problem caused by different reasons can be improved in the following aspects. Firstly, the wrapping of the second signal line 013 (i.e., the data line) by the shielding layer 022 can be enhanced and the light leakage can be reduced by designing the width and height of the shielding layer 022 in terms of the profile of the shielding layer 022. And/or, the wrapping of the shielding layer 022 around the data line can also be enhanced and the light leakage can be reduced by adding supplement/complementary rounded corners to the sharp corners of the shielding layer 022. Secondly, in terms of the profile of the data line, the light leakage problem brought about by the data line itself can be reduced by enlarging the angle of the sharp corners of the data line and/or, designing the sharp corners of the data line to be arcs to reduce the intensity of the depolarization of the light by the source & drain metal layer. For different products, the above aspects of the design can be paired with each other to effectively reduce the light leakage problem caused by various reasons such as the sharp corners of the data line and the insufficient shielding of the shielding layer 022.

In summary, embodiments of the present disclosure provide a display panel. The display panel includes a first substrate and a second substrate disposed opposite to each other. The first substrate includes a base substrate, and a first signal line, a second signal line, and a sub-pixel having a pixel electrode disposed on a side of the base substrate. The second substrate includes a base substrate, and a shielding layer disposed on a side of the base substrate. The pixel electrode, the second signal line, and the shielding layer all have at least two body portions, and corner portions connecting two adjacent body portions. Because not only the shielding layer covers the first signal line and the second signal line, but also the area of the corner portion of the second signal line is smaller than the area of the corner portion of the shielding layer, and the orthographic projection of the corner portion of the second signal line on the base substrate is within the orthographic projection of the corner portion of the shielding layer on the base substrate, it is possible to ensure that the shielding layer adequately shields the signal line, so as to reliably reduce the light leakage, and providing a better display effect.

Figure 13:
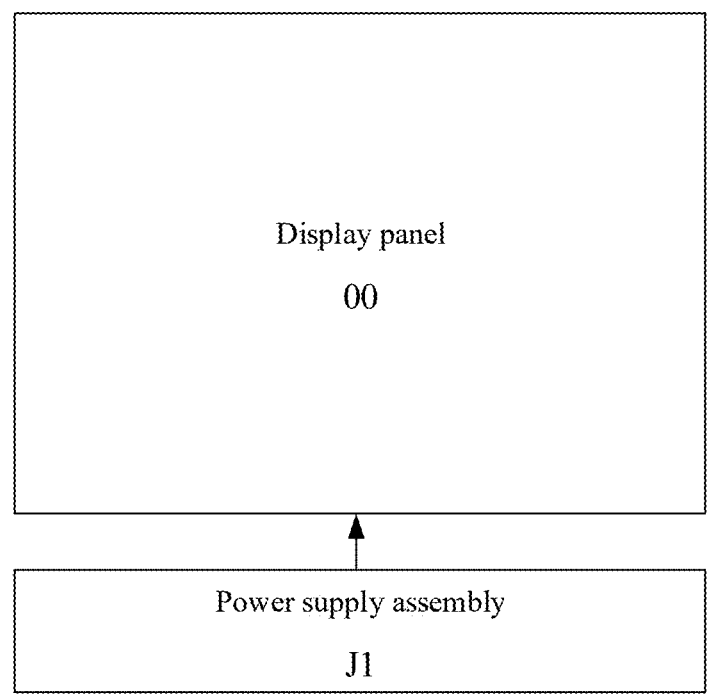
FIG. 13 is a schematic diagram of a structure of a display device according to some embodiments of the present disclosure.

FIG. 13 is a schematic diagram of a structure of a display device according to some embodiments of the present disclosure. As shown in FIG. 13, the display device includes a power supply component J1, and a display panel 00 as described in the above embodiments.

The power supply assembly J1 is coupled to the display panel 00 and is configured to supply power to the display panel 00.

In some embodiments, the display device described in the embodiments of the present disclosure is an LCD display device, a cell phone, a tablet computer, a flexible display device, a television and a monitor, and any other product or component having a display function.

It is noted that in the accompanying drawings, the dimensions of the layers and regions are exaggerated for the sake of clarity of the illustrations. Moreover, it is understood that when an element or layer is referred to as being "on" another element or layer, it is directly on the other element, or intermediate layers are present. Also, it can be understood that when the element or layer is referred to as being "under" another element or layer, it can be directly under the other element, or more than one intermediate layer or element can be present. It is also understood that when a layer or element is referred to as being "between" two layers or elements, it is the only layer between the two layers or elements, or more than one intermediate layer or element is present. Similar reference marks throughout indicates similar elements.

In addition, the terminology used in the embodiments of the present disclosure is used only for the purpose of explaining embodiments of the present disclosure and is not intended to limit the present disclosure. Unless otherwise defined, technical terms or scientific terms used in the embodiments of the present disclosure should have the ordinary meaning understood by a person of ordinary skill in the art to which the present disclosure belongs.

For example, the terms "first", "second", or "third" and the like used in the description of the patent application and the claims of the present disclosure do not indicate any order, number, or importance. Importance, but rather are used to distinguish between different components.

Similarly, words such as "one" or "one" do not indicate a limitation in number, but rather the existence of at least one.

Similar terms such as "include" or "contain" mean that the element or object that now precedes "include" or "contain" encompasses the element or object that appears in "include" or "contain". The words "include" or "contain," or similar words mean that the elements or objects now preceding "include" or "contain" cover the elements or objects listed after "include" or "contain" and their equivalents, and do not exclude other elements or objects.

The terms "up", "down", "left", or "right" are used only to indicate relative positional relationships. When the absolute position of the described object is changed, the relative positional relationship is changed accordingly.

The characters "and/or" indicate that three kinds of relationships can exist. For example, A and/or B can indicate that A alone exists, both A and B exist, and B alone exists. The character "/" generally indicates that the associated objects before and after are in an "or" relationship.

The foregoing are only optional embodiments of this application and are not intended to limit this application, and any modifications, equivalent substitutions, improvements, etc. made within the spirit and principles of this application shall be included in the scope of protection of this application.

What is claimed is:

1. A display panel, comprising: a first substrate and a second substrate disposed opposite to each other, and a liquid crystal layer disposed between the first substrate and the second substrate; wherein the first substrate comprises a first base substrate, a plurality of first signal lines and a plurality of second signal lines disposed on a side, close to the second substrate, of the first substrate, wherein the plurality of first signal lines are spaced apart in a first direction, the plurality of second signal lines are spaced apart in a second direction, and adjacent two of the first signal lines are insulatively intersected with adjacent two of the second signal lines to define a sub-pixel, the sub-pixel comprises a pixel electrode; and the second substrate comprises a second base substrate, and a shielding layer disposed on a side, close to the first substrate, of the second base substrate, wherein an orthographic projection of the shielding layer on the first base substrate covers an orthographic projection of the first signal lines on the first base substrate and covers an orthographic projection of the second signal lines on the first base substrate;

wherein the first direction is intersected with the second direction, in the first direction, the pixel electrode comprises at least two domains and a first corner portion connecting two adjacent domains, the second signal line comprises at least two line body portions one-to-one corresponding to the at least two domains and a second corner portion corresponding to the first corner portion and connecting two adjacent line body portions, and a portion of the shielding layer covering the second signal line comprises at least two shielding body portions one-to-one corresponding to the at least two domains, and a third corner portion corresponding to the first corner portion and connecting adjacent two of the shielding body portions;

an area of an orthographic projection of the second corner portion on the first base substrate is less than an area of an orthographic projection of the third corner portion on the first base substrate, and the orthographic projection of the second corner portion on the first base substrate is within the orthographic projection of the third corner portion on the first base substrate; and in the first direction, a height of a side, away from the pixel electrode, of the third corner portion is greater than a height of a side, away from the pixel electrode, of the second corner portion; and a height of a side, close to the pixel electrode, of the third corner portion is less than a height of a side, close to the pixel electrode, of the second corner portion.

2. The display panel according to claim 1, wherein in the first direction, the height of the side, close to the pixel electrode, of the second corner portion is equal to the height of the side, away from the pixel electrode, the second corner portion; a difference between the height of the side, away from the pixel electrode, of the third corner portion and the height of side, away from the pixel electrode, of the second corner portion ranges from 0 to 1 μm; and a difference between the height of the side, close to the pixel electrode, of the third corner portion and the height of the side, close to the pixel electrode, of the second corner portion ranges from 0 to 1 μm.

3. The display panel according to claim 1, wherein in the second direction, a width of the shielding layer is greater than a width of the second signal line; and a width of the third corner portion in the shielding layer is greater than a width of the shielding body portion, and a width of the second corner portion in the second signal line is equal to a width of the line body portion.

4. The display panel according to claim 3, wherein in the second direction, a difference between the width of the shielding body portion and the width of the line body portion ranges from 2 μm to 3 μm; and a difference between the width of the third corner portion and the width of the second corner portion ranges from 3 μm to 4 μm.

5. The display panel according to claim 3, wherein in the second direction, a width of a sharp corner of the third corner portion is equal to a width at any other place of the third corner portion other than the sharp corner.

6. The display panel according to claim 1, wherein in the second direction, the shielding layer further comprises an auxiliary shielding portion disposed on at least one of two sides of the third corner portion, and the auxiliary shielding portion abuts at least one side of the third corner portion.

7. The display panel according to claim 6, wherein in the first direction, two ends of the auxiliary shielding portion are coincident with two ends of the third corner portion respectively; a side, close to the third corner portion, of the auxiliary shielding portion is coincident with a side, close to the auxiliary shielding portion, of the third corner portion; and an orthographic projection of a side, away from the third corner portion, of the auxiliary shielding portion on the second base substrate is curvilinear to or rectilinear.

8. The display panel according to claim 7, wherein the orthographic projection of the side, distal from the third corner portion, of the auxiliary shielding portion on the second base substrate is rectilinear; the side, away from the third corner portion, of the auxiliary shielding portion comprises a first straight line and a second straight line intersected with the first straight line in an extending direction; and in the second direction, sharp corners formed by the first straight line and the second straight line, sharp corners of the third corner portion, and sharp corners of the second corner portion are on a same horizontal line and oriented in a same direction.

9. The display panel according to claim 7, wherein an orthographic projection of the side, distal from the third corner portion, of the auxiliary shielding portion on the second base substrate is curvilinear; the side, distal from the third corner portion, of the auxiliary shielding portion comprises a curve; and in the second direction, a concave point of the curve is on a same horizontal line as sharp corners of the third corner portion and sharp corners of the second corner portion, and a concave direction of the curve is in a same direction as orientation directions of the sharp corners of the third corner portion and orientation directions of the sharp corners of the second corner portion.

10. The display panel according to claim 9, wherein for the auxiliary shielding portion disposed on a side, away from the pixel electrode, of the third corner portion, the concave point of the curve in the auxiliary shielding portion is connected to the sharp corner of the third corner portion.

11. The display panel according to claim 6, wherein in the second direction, a maximum depth of the auxiliary shielding portion ranges from 0.5 to 1 times a target depth; wherein the target depth is a depth of the sharp corner of a side, close to the pixel electrode, of the third corner portion.

12. The display panel according to claim 1, wherein the sharp corner of the second corner portion is formed by two straight lines; and an angle of the sharp corner formed by the two straight lines is greater than an angle of the sharp corner of the third corner portion.

13. A display panel, comprising: a first substrate and a second substrate disposed opposite to each other, and a liquid crystal layer disposed between the first substrate and the second substrate; wherein
the first substrate comprises a first base substrate, a plurality of first signal lines and a plurality of second signal lines disposed on a side, close to the second substrate, of the first substrate, wherein the plurality of first signal lines are spaced apart in a first direction, the plurality of second signal lines are spaced apart in a second direction, and adjacent two of the first signal lines are insulatively intersected with adjacent two of the second signal lines to define a sub-pixel, the sub-pixel comprises a pixel electrode; and
the second substrate comprises a second base substrate, and a shielding layer disposed on a side, close to the first substrate, of the second base substrate, wherein an orthographic projection of the shielding layer on the first base substrate covers an orthographic projection of the first signal lines on the first base substrate and covers an orthographic projection of the second signal lines on the first base substrate;
wherein
the first direction is intersected with the second direction, in the first direction, the pixel electrode comprises at least two domains and a first corner portion connecting two adjacent domains, the second signal line comprises at least two line body portions one-to-one corresponding to the at least two domains and a second corner portion corresponding to the first corner portion and connecting two adjacent line body portions, and a portion of the shielding layer covering the second signal line comprises at least two shielding body portions one-to-one corresponding to the at least two domains, and a third corner portion corresponding to the first corner portion and connecting adjacent two of the shielding body portions;
an area of an orthographic projection of the second corner portion on the first base substrate is less than an area of an orthographic projection of the third corner portion on the first base substrate, and the orthographic projection of the second corner portion on the first base substrate is within the orthographic projection of the third corner portion on the first base substrate; and
an orthographic projection of the sharp corner of the second corner portion on the first base substrate is in an arc shape; and an angle formed by tangent lines of the arc is equal to an angle of the sharp corner of the third corner portion.

14. A display device, comprising: a power supply assembly, and a display panel;
wherein the power supply assembly is coupled to the display panel and is configured to supply power to the display panel; and the display panel comprises: a first substrate and a second substrate disposed opposite to each other, and a liquid crystal layer disposed between the first substrate and the second substrate; wherein
the first substrate comprises a first base substrate, a plurality of first signal lines and a plurality of second signal lines disposed on a side, close to the second substrate, of the first substrate, wherein the plurality of first signal lines are spaced apart in a first direction, the plurality of second signal lines are spaced apart in a second direction, and adjacent two of the first signal lines are insulatively intersected with adjacent two of the second signal lines to define a sub-pixel, the sub-pixel comprises a pixel electrode; and the second substrate comprises a second base substrate, and a shielding layer disposed on a side, close to the first substrate, of the second base substrate, wherein an orthographic projection of the shielding layer on the first base substrate covers an orthographic projection of the first signal lines on the first base substrate and covers an orthographic projection of the second signal lines on the first base substrate;

wherein the first direction is intersected with the second direction, in the first direction, the pixel electrode comprises at least two domains and a first corner portion connecting two adjacent domains, the second signal line comprises at least two line body portions one-to-one corresponding to the at least two domains and a second corner portion corresponding to the first corner portion and connecting two adjacent line body portions, and a portion of the shielding layer covering the second signal line comprises at least two shielding body portions one-to-one corresponding to the at least two domains, and a third corner portion corresponding to the first corner portion and connecting adjacent two of the shielding body portions;

an area of an orthographic projection of the second corner portion on the first base substrate is less than an area of an orthographic projection of the third corner portion on the first base substrate, and the orthographic projection of the second corner portion on the first base substrate is within the orthographic projection of the third corner portion on the first base substrate; and in the first direction, a height of a side, away from the pixel electrode, of the third corner portion is greater than a height of a side, away from the pixel electrode, of the second corner portion; and a height of a side, close to the pixel electrode, of the third corner portion is less than a height of a side, close to the pixel electrode, of the second corner portion.

15. The display device according to claim 14, wherein in the first direction, the height of the side, close to the pixel electrode, of the second corner portion is equal to the height of the side, away from the pixel electrode, the second corner portion; a difference between the height of the side, away from the pixel electrode, of the third corner portion and the height of side, away from the pixel electrode, of the second corner portion ranges from 0 to 1 µm; and a difference between the height of the side, close to the pixel electrode, of the third corner portion and the height of the side, close to the pixel electrode, of the second corner portion ranges from 0 to 1 µm.

16. The display device according to claim 14, wherein in the second direction, a width of the shielding layer is greater than a width of the second signal line; and a width of the third corner portion in the shielding layer is greater than a width of the shielding body portion, and a width of the second corner portion in the second signal line is equal to a width of the line body portion.

17. The display device according to claim 16, wherein in the second direction, a difference between the width of the shielding body portion and the width of the line body portion ranges from 2 µm to 3 µm; and a difference between the width of the third corner portion and the width of the second corner portion ranges from 3 µm to 4 µm.

18. The display device according to claim 16, wherein in the second direction, a width of a sharp corner of the third corner portion is equal to a width at any other place of the third corner portion other than the sharp corner.

* * * * *